United States Patent Office 2,794,481
Patented June 4, 1957

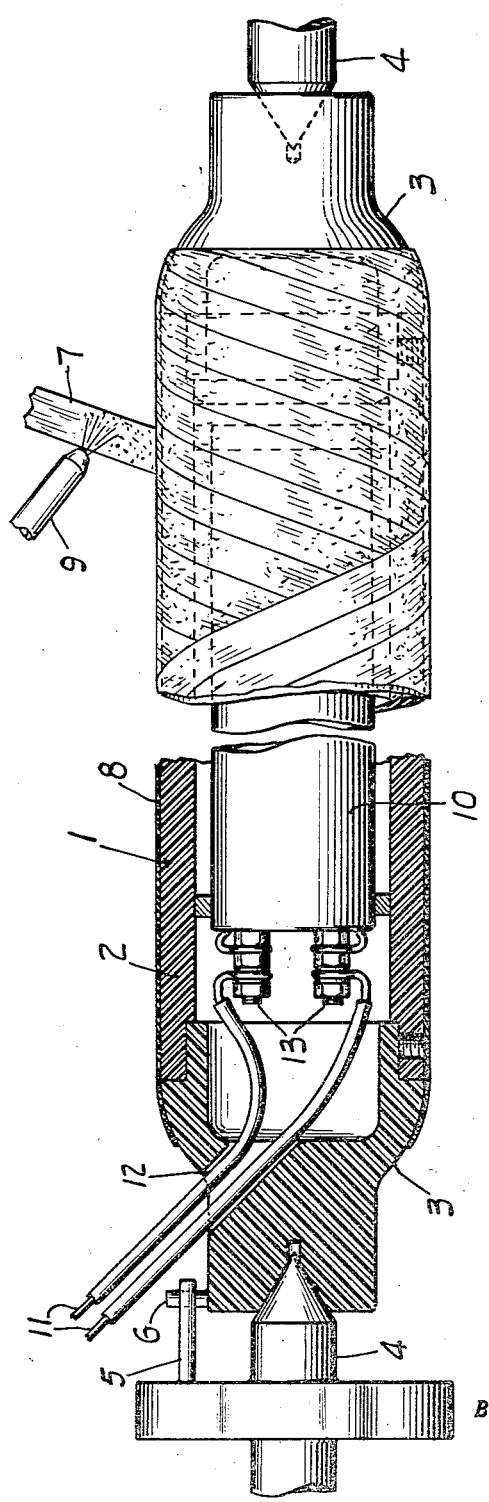

2,794,481
METHOD AND APPARATUS FOR MAKING FIBER REINFORCED RESIN TUBING

Archie C. Anderson, Milwaukee, Wis., assignor to A. O. Smith Corporation, Milwaukee, Wis., a corporation of New York Application February 4, 1955, Serial No. 486,111

7 Claims. (Cl. 154—1.8)

This invention relates to a method and apparatus for making fiber reinforced resin tubing and more particularly to a method and apparatus for prestressing the fiber reinforcement during curing of the resin.

In a fiber reinforced resin pipe or tubing undesirable stresses are developed in the resin when the resin is cured. One source of stress is produced by the shrinkage of the resin when it changes from the gel to the solid state during polymerization. The resin will generally shrink from 2 to 6% depending on the particular resin employed.

A second source of stress is developed in the pipe due to the differences in the linear coefficient of thermal expansion between the reinforcing fibers and the resin matrix. The resin is cured at an elevated temperature and on cooling from the curing temperature the resin will contract to a greater degree than fibers formed of glass, asbestos or metal due to the greater coefficient of expansion of the resin. Since the resin is bonded to the fibers it is partially restricted from shrinking by the fibers and a stress results. These stresses produce planes of weakness in the pipe and subsequent failures are apt to occur at these planes.

To minimize the resin stresses it has been suggested in the past to put the reinforcing fibers under tension while the resin is in the liquid form. After the resin solidifies the tension in the fibers would tend to put the resin into compression which would act to reduce the residual tensile stress in the resin.

It has been proposed to put the fibers under tension by passing the fibers over a series of tensioning rollers or guides as the fibers are being wound into tubular form. However, this method may result in abrasion of the fibers and a consequent weakening of the reinforcement.

A second proposed method of applying tension to the fibers is to employ an inflatable core or mandrel on which the pipe is wound. With this method the core is inflated during curing to place the fibers under tension. However, all of the methods used in the past have been cumbersome and a source of trouble in operation.

The present invention is directed to a simple and inexpensive method of applying tension to the reinforcing fibers in a resin pipe during curing of the resin. According to the invention the mandrel on which the pipe is wound is composed of a material having a high linear coefficient of thermal expansion. The linear coefficient of thermal expansion should be greater than the coefficient of expansion of the resin of the pipe and in all cases above $50 \times 10^{-6}/°C$. The mandrel is heated to bring the liquid resin up to the curing temperature and this heating causes the mandrel to expand radially and stretch the circumferentially wound fibers and place the same under tension. After the resin is solidified and the mandrel is allowed to cool, the resin will shrink. However, the fibers which have a relatively small linear coefficient of thermal expansion compared to the resin and which normally shrink to a lesser extent than the resin, will in this case shrink to a greater extent than the resin. This is due to the fact that the mandrel, on cooling, will shrink to a greater degree than the resin, and the fibers which were stretched by the heat expansion of the mandrel will follow the shrinkage of the mandrel. Thus the fibers tend to shrink to a greater degree than the resin matrix and the resin is put under compression.

The present invention provides a very convenient and economical method of prestressing the reinforcing fibers during curing of the resin. The resin is normally heated to the curing temperature and this heat is utilized to expand the mandrel and thereby put the fibers under tension.

The drawing furnished herewith illustrates the best mode presently contemplated of carrying out the invention.

The drawing is a side elevation of the apparatus of the present invention with parts broken away in section.

The drawing illustrates an apparatus for applying tension to the fiber reinforcement in a tubular resin article during curing of the resin.

The apparatus comprises a mandrel 1 which is formed of a generally cylindrical shell 2 enclosed at the ends by heads 3. To mount the mandrel for rotation, the heads 3 are provided with conical recesses which receive spindle supports 4. One of the spindle supports is driven by any suitable means, and the rotation of the spindle support is transmitted to the mandrel by arm 5 which extends outwardly from the driven spindle support and engages pin 6 on the mandrel.

A fibrous strand 7, formed of long reinforcing fibers or filaments of glass, asbestos, metal or the like, is wound around the rotating mandrel in a generally helical or circumferential pattern. The strand 7 is traversed along the mandrel either manually or by means of a winding head to produce a tubular article 8 formed of a plurality of superimposed layers having a double helical pattern.

The strand 7 is coated or impregnated with an uncured thermosetting liquid resin either during winding or after winding by any conventional method. As shown in the drawing, the resin is applied to strand 7 by discharging the resin from a nozzle 9 onto the strand as the strand is wound on the mandrel. Alternatively, the strand may be passed through a trough containing the resin, the completed article 8 may be dipped in a resin trough, or any other desired method may be utilized to impregnate the strand with resin.

Heat is supplied to the resin to accelerate the curing cycle of the same. The resin is heated to a temperature in the range of 150° to 450° F. depending on the particular resin employed. The heating may be accomplished by any desired means. As shown in the drawing, an electrical heating element 10, in the form of a cartridge, is disposed within the mandrel between heads 3. To supply electrical energy to the heating element 10, electrical leads 11, attached to a suitable slip-ring mechanism, not shown, pass through an opening 12 in one of the heads 3 and are connected to contacts 13 on the element 10.

In order to put the circumferentially wound fibers 7 under tension during the curing operation, the mandrel 1 is formed of a material having a very high linear coefficient of thermal expansion. Generally, the mandrel 1 should have a linear coefficient of thermal expansion greater than that of the usual metals from which a mandrel can be fabricated. More specifically, the linear coefficient of thermal expansion should be greater than $50 \times 10^{-6}/°C$. and should be higher than the linear coefficient of thermal expansion of the resin employed as the matrix of the article if the coefficient of the resin is above $50 \times 10^{-6}/°C$. In addition, the mandrel should have a heat distortion temperature of over 250° F. so that the mandrel will not soften or decompose at the temperatures of curing which are often in the range of 200 to 250° F.

A material such as nylon, a reaction product of adipic acid and adipamide, has the required properties to be employed as the mandrel. The nylon can be formed into cylindrical shape and has a linear coefficient of thermal expansion of $150 \times 10^{-6}/°C$. and a heat distortion temperature of about 300° F. Commonly used thermosetting resins, such as epoxy and polyesters, have linear coefficients of thermal expansion generally within the range of $40 \times 10^{-6}/°C$. and $100 \times 10^{-6}/°C$. and thus the coefficient of expansion of nylon is considerably greater than these resins.

Another material that can be employed as mandrel 1 is phenol formaldehyde with a sisal felt filler. This material when molded as a mandrel has a linear coefficient of thermal expansion of 70 to $200 \times 10^{-6}/°C$. depending on the amount of sisal felt employed and a heat distortion temperature of 320° F.

A third material that can be used for mandrel 1 is Teflon, a polymer of tetrafluoroethylene. This material when molded has a linear coefficient of thermal expansion of $100 \times 10^{-6}/°C$. and a heat distortion temperature of 270° F.

As the above mentioned materials have a relatively low rate of heat conductivity, metallic dust may be mixed with the material prior to molding into the mandrel to raise the heat conductivity of the mandrel and increase the rate of heat transfer through the mandrel to the article to be cured. As the addition of metallic dust or powder to the mandrel will decrease the linear coefficient of thermal expansion of the mandrel, a balance can be achieved whereby a sufficient amount of metallic powder can be added to the mandrel to raise the rate of heat conductivity of the mandrel and yet maintain the linear coefficient of thermal expansion above that of the resin matrix of the article. Metals, such as aluminum and zinc which have relatively high coefficients of thermal expansion with respect to other metals, are most desirable to be used as the metallic dust.

Due to the high rate of thermal expansion of the mandrel 1, the mandrel is expanded radially during the heating to increase the diameter thereof. This expansion of the mandrel applies force to the fibers in the strand 7, tending to stretch the fibers and putting the fibers under tension while the resin is in the liquid form. After the resin has been heated to the curing temperature and cured the mandrel is allowed to cool and is thereafter removed from within the tubular article.

The mandrel, having a higher linear coefficient of thermal expansion than the resin, will shrink on cooling to a greater extent than the resin, and the fibers which were stretched by the expansion of the mandrel will follow the shrinkage of the mandrel and will also contract more than the resin. The resin will tend to resist this greater contraction of the fibers with the result that the resin is put under compression. During service when the tubular article is subjected to an internal pressure, this internal pressure must initially overcome the compressed condition of the resin before the resin is put under tension and thus the resin is able to withstand a greater internal pressure before rupture.

Various modes of carrying out the invention are contemplated as being within the scope of the following claims particularly pointing out and distinctly claiming the subject matter which is regarded as the invention.

I claim:

1. An apparatus for making a fibrous reinforced resin tubular article comprising, a generally cylindrical mandrel formed of a material having a linear coefficient of thermal expansion greater than $50 \times 10^{-6}/°C$., means for winding a fibrous strand on said mandrel in a generally helical pattern to form the article, means for impregnating the strand with a liquid uncured thermosetting resin, and means for supplying heat to the mandrel to expand the mandrel radially and place the fibers under tension during curing of the resin.

2. In an apparatus for making a tubular resin article reinforced with circumferentially wound glass fibers, a rigid mandrel to internally support the article during curing of the resin, said mandrel being formed of a non-metallic material having a linear coefficient of thermal expansion greater than $50 \times 10^{-6}/°C$. and greater than the linear coefficient of thermal expansion of the resin to be cured and having a heat distortion temperature of over 250° F., and said mandrel expanding in diameter during heating thereof to stretch the circumferentially wound fibers and put the same under tension during curing of the resin.

3. In an apparatus for making a tubular resin article reinforced with circumferentially wound fibers, a rigid generally cylindrical mandrel to internally support the article during curing of the resin, said mandrel having a hollow generally cylindrical shape and being formed of a nonmetallic material having a linear coefficient of thermal expansion greater than $50 \times 10^{-6}/°C$. and greater than the linear coefficient of thermal expansion of the resin to be cured and said material having a heat distortion temperature of over 250° F., and means for supplying heat to the mandrel to heat the mandrel to a temperature up to 250° F. to cure the resin, said mandrel expanding in diameter during heating thereof to stretch the circumferentially wound fibers and put the same under tension during curing of the resin.

4. In an apparatus for making a tubular resin article reinforced with helically wound glass fibers, a mandrel to internally support the article during curing of the resin, said mandrel being formed of a non-metallic material impregnated with a finely divided metallic substance and said mandrel having a linear coefficient of thermal expansion greater than $50 \times 10^{-6}/°$ C. and greater than the linear coefficient of thermal expansion of the resin to be cured and having a heat distortion temperature of over 250° F., said mandrel expanding in diameter during heating thereof to stretch the circumferentially wound fibers and put the same under tension during curing of the resin.

5. In an apparatus for making a tubular resin article reinforced with circumferentially wound glass fibers, a mandrel to internally support the article during curing of the resin, said mandrel formed of the reaction product of adipic acid and adipamide impregnated with a finely divided metal selected from the group consisting of aluminum and zinc and said mandrel having a linear coefficient of thermal expansion greater than $50 \times 10^{-6}/°$ C. and greater than the linear coefficient of thermal expansion of the resin to be cured and having a heat distortion temperature of over 250° F., said mandrel expanding in diameter during heating thereof to stretch the circumferentially wound fibers and put the same under tension during curing of the resin.

6. In an apparatus for making a tubular resin article reinforced with helically wound fibers, a mandrel to internally support the article during curing of the resin, said mandrel having a hollow generally cylindrical shape and being formed of a non-metallic material impregnated with a finely divided metal selected from the group consisting of aluminum and zinc, said mandrel having a linear coefficient of thermal expansion greater than $50 \times 10^{-6}/°$ C. and greater than the linear coefficient of thermal expansion of the resin to be cured and having a heat distortion temperature of over 250° F., and means for supplying heat to the hollow interior of the mandrel to heat the mandrel to a temperature of 200° to 250° F. to cure the resin, said mandrel expanding in diameter during heating thereof to stretch the circumferentially wound fibers and put the same under tension during curing of the resin.

7. A method of making a hollow resin article reinforced with helically disposed fibers, which comprises, winding the fibers in a generally helical pattern on the outer surface of a mandrel, impregnating the fibers with an uncured thermosetting resin having a linear coefficient of thermal expansion substantially less than the linear coefficient of thermal expansion of the mandrel, heating the mandrel to expand the same in diameter and place the fibers under tension, curing the resin while maintaining the fibers under tension to bond the fibers together to form a rigid article, and removing the mandrel from within the hollow article.

References Cited in the file of this patent

UNITED STATES PATENTS

| | | |
|---|---|---|
| 1,679,345 | Austin | Aug. 7, 1928 |
| 2,202,042 | Blount | May 28, 1940 |
| 2,477,180 | Hemming | July 26, 1949 |
| 2,571,717 | Howald et al. | Oct. 16, 1951 |
| 2,723,426 | Pelley | Nov. 15, 1955 |
| 2,739,350 | Lampman | Mar. 27, 1956 |